United States Patent [19]

Peacock et al.

[11] Patent Number: 5,491,929
[45] Date of Patent: Feb. 20, 1996

[54] LEAK-RESISTANT TRANSPORTATION AND STORAGE CONTAINER

[75] Inventors: Richard S. Peacock; Joe L. Peacock, both of Jacksonville, Tex.

[73] Assignee: Speedy Products Co., Jacksonville, Tex.

[21] Appl. No.: 321,258

[22] Filed: Oct. 11, 1994

[51] Int. Cl.⁶ ................................................. A01G 25/00
[52] U.S. Cl. .................................. 47/84; 47/81; 47/41.01
[58] Field of Search ........................ 47/81, 79 N, 79 D, 47/71 R, 75 N, 84 R, 41.01

[56] References Cited

U.S. PATENT DOCUMENTS

| | | | |
|---|---|---|---|
| D. 128,485 | 7/1941 | Fuld | 47/41.01 |
| 3,738,060 | 6/1973 | Jullien-Davis | 47/38.1 |
| 4,219,967 | 9/1980 | Hickerson | 47/72 |
| 4,858,381 | 8/1989 | Walton et al. | 47/79 |
| 4,903,432 | 2/1990 | Velagaletti et al. | 47/81 |
| 4,996,792 | 3/1991 | Holtkamp, Sr. | 47/81 |
| 5,282,335 | 2/1994 | Holtkamp | 47/81 |

FOREIGN PATENT DOCUMENTS 2634037  2/1978  Germany ................. 47/79 V

*Primary Examiner*—Henry E. Raduazo
*Attorney, Agent, or Firm*—Ronald B. Sefrna

[57] ABSTRACT

A device for leak-resistant transport and storage of container plants is disclosed. The device employs an outer liquid reservoir which has a open-ended re-entrant structure extending from the top of the reservoir into the body thereof into which is placed a pot containing a plant. The height of the re-entrant structure is determined by an optimization formula so that a maximum quantity of liquid will be retained in the reservoir regardless of the orientation of the reservoir.

3 Claims, 4 Drawing Sheets

LEAK-RESISTANT TRANSPORTATION AND STORAGE CONTAINER

TECHNICAL FIELD OF THE INVENTION

This invention relates to a horticultural transportation and storage device in particular to a leak-less reservoir for transporting and storing live plants in a container while supplying life sustaining water to the plant.

BACKGROUND OF THE INVENTION

Transportation of live potted plants to nurseries and the like has been known for many years. There are several problems associated with such transportation these being:

provision of water during transportation, and provision of water after the goods reach their destination.

A large potted plant can readily sustain itself for an extended period of time during transportation and after reaching its destination if ample water is applied to the soil within the pot before shipment. A large potted plant is often defined as having a pot diameter of greater than 6 inches. The soil will absorb moisture and store it for use by the plant. As the potted plant and its container become smaller, less moisture can be stored in the soil and it will become necessary to (a) add water during transportation or (b) provide a source of free water stored with the pot/plant under transportation. Option (a) is normally out of the question for common carriers and some form of option (b) is therefore required.

It would seem that provision of water after the goods reach their destination would be simple. In a nursery operation, trained nursery personnel would readily take care of the task; however, in a mass merchandising operation dedicated nursery personnel are generally not available. In fact, the mass merchandiser typically will not hire personnel who are trained in the upkeep of plants therefore the received goods often die before sale. Ordinarily this would seem to cause little concern to the original seller, however, these goods are purchased with a replacement guarantee and the original seller often winds up paying (technically for the inaction of technically unqualified employees hired by the retailer) as the retailer is forced to honor the replacement guarantee.

Again, the large potted plant will more readily survive the mass merchandising operation because of the larger entrained moisture supply: plus, anybody can literally dump water into a large pot. The small plant, which can be defined as having a pot diameter of about 2-inches or less, will not readily survive a mass merchandising operation and is not generally offered for sale at such retailers.

The transportation and storage problem becomes acute for miniature plants, such as Kalanchoe, Violet, Parsley, Exacum, and other similar sizes, which are available in small containers of about one inch diameter. Miniature plants are generally shipped to nurseries by second-day air shipment and typically receive immediate attention upon arrival. In order to provide some protection and moisture during shipment, the miniature pot and plant are first thoroughly watered, placed in an empty reservoir and a plastic sleeve wrapped about the outside of the reservoir, pot and plant. The reservoir is shipped empty so that water will not be spilled during shipment if the shipping container is turned on edge or upside down. The retail-nursery will remove the plastic sleeve, water the soil, fill the reservoir and tend to the plant. Due to the severely limited amount of water that such a small soil mass is able to retain, most all of the water evaporates during transport. Thus the plant requires immediate attention upon arrival. Because of these limitations, the miniature plant is not typically offered for sale by the mass merchandiser; however, the mass merchandiser has indicated a strong interest in such retail sales, if such intense care related to the watering of the miniature plant can be eliminated. The mass merchandiser simply wishes to open the shipping container and place the miniature plants on display.

The mass merchandiser requires that the plant be able to arrive with a supply of water and survive a reasonable period of time while sitting on the retail shelf without any attention. The mass merchandiser does not want to be required to water the plant upon its arrival nor for the length of time, perhaps several days, while the plant has the best chance of being sold. The requirements of the mass merchandiser can only be satisfied by a unique solution. The instant invention provides an apparatus that allows such plants to be shipped via normal shipping methods by providing a leak-less water reservoir, by providing sufficient water for shipment, and by providing water for several days at the mass merchandiser's retail facility.

PRIOR ART

The prior art has not directly addressed the problems of transportation and storage of miniature plants as examined above. The prior an has looked at storage and watering of plants by the end-user. U.S. Pat. No. 3,738,060 (Jullien-Davin) discloses a Plant Support with Watering Tube Spiralling Therearound which uses a reservoir located below a flower pot to supply water to an electric driven pump. The pump forces water up a tube which spirals around a central stake about which the plant is meant to grow. The pump requires electric power which makes this concept unsuitable for transportation. Additionally the concept is really unsuitable for miniature plants and no thought has been given to spillage from the reservoir.

U.S. Pat. No. 4,219,967 (Hickerson) discloses a Flower Pot Watering Apparatus which also utilizes a reservoir located under the pot. This system, designed for the end-user, places the flower pot on top of a fabric wick which draws water from an open reservoir. If the device is tilted to one side or another, the pot would fall off of the reservoir and water will spill out of the reservoir. Thus, this invention will not address the transportation problem examined above.

U.S. Pat. No. 4,903,432 (Velagaleti et al.) discloses an Autoclavable Reusable, Sterile Plant Growth System and Method which, once more, uses a reservoir located underneath the flower pot. This apparatus is designed for laboratory use and is not concerned with the retail market's end-user. The device is designed to totally seal which makes it difficult to water and, because it is a laboratory device, it is very complex.

U.S. Pat. Nos. 4,858,381. (Walton) and 4,996,792 (Holtkamp, Sr.) both disclose reservoir based devices that are directed at supplying water to a plant being enjoyed by a retail end-user; however, both devices do not directly address the transportation problem. Walton discloses a Floral Container and Water Reservoir which is designed to support an arrangement of cut flowers; whereas, Holtkamp, St. discloses a Plant Watering Container designed for use with flower pots containing very small plants. Both of these patents are similar, will serve to store and maintain a plant, but do not address the transportation problem in that spillage can easily occur.

Walton shows a two pan reservoir system with a closed bottom section designed to receive cut flowers in the upper section of the apparatus. A piece of floral foam is placed in the upper section in which the cut flower stems are placed. The closed bottom section has two slots through which a wick passes into the lower reservoir in order to draw water into the upper section to be received by the foam. The closed bottom stops the foam from falling into the water reservoir and serves to help retain water within the reservoir. The apparatus has two essentially similar embodiments and allows a person to move the cut flowers from one point [in a room] to another without spilling water. However, if this apparatus is severely tipped or turned on end, water will spill from the container. The device requires the use of plugs to close off the reservoir fill opening to prevent spillage and concerns itself with dimensioning the reservoir and the upper section opening so that empty containers may be stacked without damaging the frangible floral foam.

Holtkamp, Sr. shows a miniature flower pot placed within a bevelled opening on the top of a plastic reservoir. The system is specifically designed to water African violets which do not like top watering. The reservoir is designed in two separable pans. When the water level drops, the top section can be lifted from the bottom section without touching the miniature pot or the plant. Water can now be added to the bottom section and the top section replaced. This concept works well with a stationary plant, but if the pot and its reservoir are tilted on edge, water will seep between the top and bottom portions and the reservoir will drain. Water can seep or spill from the reservoir through the bevelled opening in the top section if the container is tipped or turned upside down. Thus, the Holtkamp device is not suitable for transportation.

The prior an has addressed the problem of watering of miniature plants at the end-users home (or place of business) by using a lower reservoir attached to a flower pot. The prior art has not addressed the problem of spillage of water from the reservoir during transportation. A problem that will cause the live plant to die either during transportation or during the period that it is on the retail shelf awaiting sale. Preservation of the plant is an acute problem at a retail sales point associated with a mass merchandiser. Thus, there remains a substantial need for a spill-proof leak-less container system for the miniature plant market.

SUMMARY OF THE INVENTION

The invention consists of a single plastic container, molded in two parts being (1) a reentrant structure matching the shape of a miniature flower pot and generally taking the form of a cone; and (2) the container which acts as a water reservoir for a miniature plant placed within the re-entrant structure. The re-entrant structure is open at both ends, begins at the top of the container and extends downward into the container.

A miniature flower pot (filled with soil and equipped with a wick which exits the pot through the drain hole at the bottom of the pot) is placed into the re-entrant cone's opening in the top of the container. Generally the originating shipper or nursery restrains the pot in the container by a passing a rubber band around and under the container and catching the upper edge of the pot. The shipper or nursery will often place a plastic sleeve about the whole product (passing around the container, the pot and the plant) in order to protect the plant before putting the rubber band in place. Therefore, the pot will not fall out of its container especially as the container is turned on edge or turned to an upside down position. (The soil and the plant are retained by root hooks molded into the flower pot so that the plant can withstand being turned upside down. The optional transportation plastic sleeve also serves to restrain the plant and soil. These techniques are well known in the art.)

The re-entrant structure is the heart of the instant invention. This re-entrant structure is open at the top and the bottom and is so named because the structure re-enters the container from the top of the container. All the prior an teaches that a reservoir must be totally enclosed in order to retain water within the reservoir. Walton shows a re-entrant structure that is closed at the bottom and has openings through which a wick passes. The wick serves two purposes, first it draws water lipwards into the re-entrant structure and it seals the openings so that water cannot readily escape from the lower chamber. Walton specifically teaches that the lower chamber must be sealed so that it will not leak or slosh water. A specific step that places a wick through an opening (or series of openings) must be incorporated in the manufacturing phase.

The instant invention discovered that a carefully designed re-entrant structure can be left open and that water will not readily spill or slosh out of the container. This discovery means that the extra step of placing a wick through an opening or openings can be eliminated; rims, making the device cheaper to manufacture. The wick would be inserted in the plant pot during the planting phase and its placement is not critical to plugging a potential water leak. The open reentrant structure means that the plant pot and its wick can easily be inserted. The wick will readily fall into the water reservoir.

It was further discovered that the depth of the structure can be carefully selected to minimize the spillage of water from within the container as the container is turned on edge or further to an upside down position. The optimum depth of the structure is a function of its diameter (which is fixed by the miniature flower pot), the diameter of the container and the height of the container. It can be shown that the optimum depth of the re-entrant structure is less than one-half of the overall height of the container/reservoir.

If the depth of the cone is too long, most of the water will spill out as the container is tipped on its side. If the depth of the cone is too short most of the water will spill out as the container is turned upside down. A greater volume of water can be retained within the container when the depth of the re-entrant structure approaches the depth of the container but this minimizes the tip volume which in turn minimizes the growing plant's transport and retail shelf life. Thus, there is an optimum depth for the re-entrant structure and it should be realized that the relationship of re-entrant structure diameter and container diameter will also enter into the equation. Thus, the depth of the structure is precisely chosen as the instant invention's optimum. It should also be noted that the cone shaped re-entrant structure actually produces a greater tip volume rather than, for example, a cylindrical structure whose wall are parallel to the container.

The re-entrant structure's optimum depth is precisely set. The significance of this precise depth is shown by drawing a straight line from one point at the top of the container to another opposite point at the bottom of the container touching the bottom of the re-entrant structure along the way. This optimum set depth enables a particular volume of fluid, the tip volume, to be contained between the inner sides of the container and the outer sides of the re-entrant structure. The tip volume is easily arrived at by filling the container with water, turning the full container and allowing water to spill from the open bottom and out of the top of the re-entrant structure. A maximum quantity of water, the tip volume, will remain in the container. When the container has the properly filled tip volume, turned on edge or upside down it is virtually leak-less.

The invention will not allow water to spill from the reservoir even when a master container, holding a number of plants within the instant inventions, is tipped or even turned upside down. Because the reservoirs will retain water, the instant inventions will sustain plants and avoid any problems for a common carrier caused by spillage of water during transportation and it will also provide water for a reasonable period of time after receipt by the merchant. Thus, the instant invention will fit the needs of the common carrier and most importantly of the mass merchandiser. It should be noted that this concept can readily be expanded to any size of pot/plant combination.

DESCRIPTION OF THE PREFERRED EMBODIMENT

Figure 3:
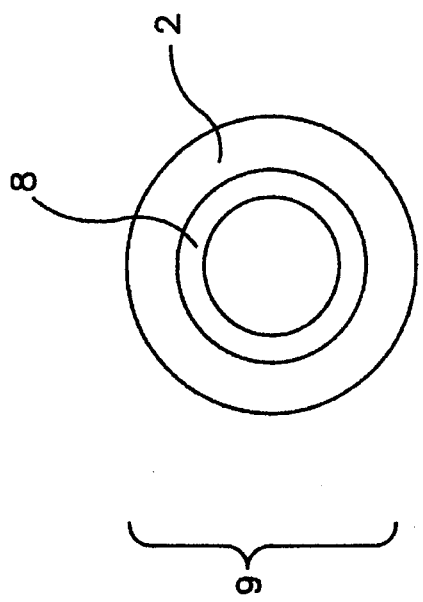
FIG. 3 is a plane view of the instant invention.
Figure 1:
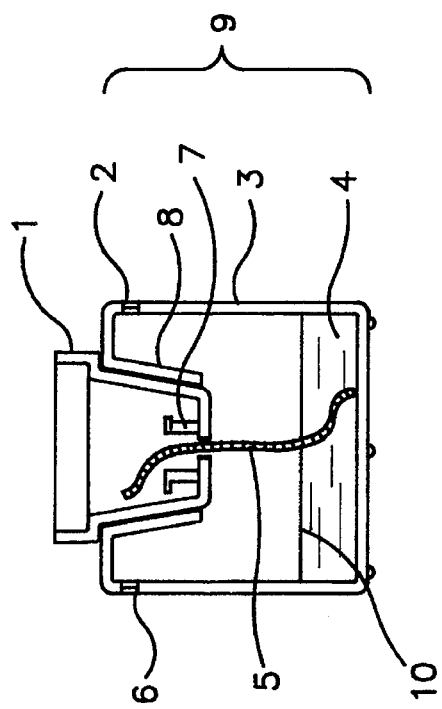
FIG. 1 is a general cross-sectional view of the instant invention showing the miniature pot in place ill the re-entrant structure, the root hooks, and the wick.

FIG. 1 shows a general cross-sectional view of the preferred embodiment of the instant invention, 9, utilizing a cone shaped re-entrant structure, 8. In the illustration, a miniature flower pot, 1, is placed within the matching re-entrant structure. This particular flower pot is shown with root hooks, 7, which are not necessary for the proper operation of the invention; however, the soil and the actual plant are not illustrated. A wick, 5, exits the pot through the drain hole at the bottom of the pot and draws water from the water reserve, 4, within the container/reservoir, 9. Although the preferred embodiment will be described utilizing a miniature flower, for which the invention is properly suited, any person skilled in the art can recognize that the principle of the instant invention can readily be extended to flower pots of any size. In fact, this principle can be extended to any object that requires liquid. Thus, the use of a miniature pot to describe this invention should not be construed as a limitation on the apparatus nor its use.

As stated previously, the re-entrant structure is the heart of the invention and incorporates the discovery that an open container will not necessarily spill or slosh water out from a container. All the prior art teaches the use of a closed container in order to retain water within a reservoir. One invention (Walton) uses a similar re-entrant structure, but uses a closed bottom with openings for a wick. The Walton wick in turn seals off the structure and reduces the chance of spillage. It should be noted that, if the Walton container is turned upside down, the double wick will continue to allow water to seep from the reservoir whenever the Walton container is fully filled as Walton teaches. The seepage is exasperated because gravity will pull water down through the wick. On the other hand, if the Walton container is partially filled, then seepage will not readily occur. However, whenever partially filled, Walton suffers from a particular drawback. Under this condition, when the Walton container is turned on edge or upside down, no water will reach the wick (particularly when upside down) and the plant will suffer from lack of moisture.

The instant invention when turned on its side or upside down tends to pull the water reserve away from the single wick; however, gravity will generally cause the single wick to follow the reserve and remain in the water reserve. This means that the plant will not suffer from lack of moisture under these conditions. Excess water will not readily seep from the plant because the wick is smaller and the water must be drawn up along the wick to the plant. This is not like the exasperated condition found in Walton, when the Walton container is completely full, where gravity will pull the water down through the wick. The instant invention will continue to supply water when on its side unlike a partially filled Walton container, because the smaller wick will remain within the water.

Figure 2:
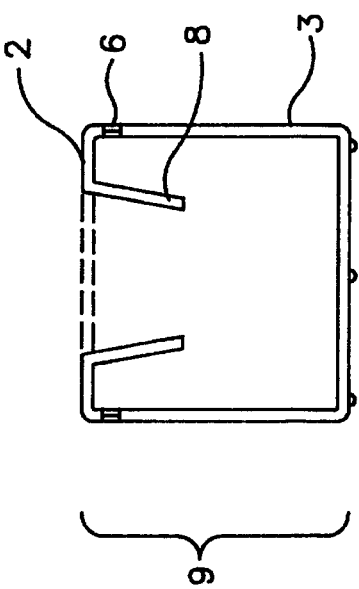
FIG. 2 is a cross sectional view of the instant invention illustrating pertinent details.

The container/reservoir, 9, is manufactured in two halves; the upper half, 2, and the lower half, 3. The two halves are bonded at joint 6, and, although FIG. 2 shows the joint located near the top of the overall container/reservoir, the joint can be established at any convenient location in the side of the reservoir. It is known, however, that water will leak from a plastic joint that is not properly bonded. Thus, if the container/reservoir is tipped on its side or if the improperly bonded joint is located below the normal water line, 10, then the water reserve will leak out and the plant will be left without any water. Bonding techniques are well known in the an and if properly done will cause a perfect bond between the two halves of the container. Preferably ultrasonic bonding is used; however, chemical or mechanical techniques could be employed. The container is manufactured in two halves because the re-entrant structure makes it almost physically impossible to manufacture as a single part.

Use of the device is straightforward. The grower places a watering wick in a flower pot; adds the proper soil to the pot; and places the plant, seed or seedling in the pot. The plant is then grown in the normal manner. When the product is ready for shipping the container is partially filled with water, turned on its side and then upside down to remove the excess water. This step places the water reserve at its optimum level. Alternatively, a precisely measured quantity of water can be poured into the reservoir. The optimum level allows for maximum reserve with no spillage. The plant is watered and the pot is placed into re-entrant structure as shown in FIG. 1. The use of a pot with root hooks, 7, is recommended but is not absolutely necessary.

Many nursery/shippers place a thin plastic sleeve about the container which extends upward about the plant. This sleeve provides additional protection to the plant. The container is generally placed in a small carton which comes to the top of the outer container. A rubber band is retained within that small carton and, as the container is placed in the carton, the rubber band is placed over the top lip of the flower pot. This band now holds the container, the flower pot and the optional plastic sleeve together as a unit and prevents the pot from falling out of the container if the small carton is tipped on edge or placed upside down. The small cartons are then placed in a shipping container or "master carton".

The master carton will generally be divided into compartments in which the individual small cartons will fit. A honey-comb structure is placed over the smaller cartons to restrain them within the master carton. The master carton can now be tipped, or even turned upside down, without displacing the smaller cartons. The only item that might be displaced is the plant, but the plant in turn is retained within the pot by optional root hooks or the optional plastic sleeve. It should be noted that, if the master container is turned upside down and beaten on, then all items within the master carton will, most likely, be displaced. But, no water will be spilled outside the shipping carton! Some water might slosh out of the individual reservoirs under these conditions, but it will be minimal and will be soaked up by the master carton. Thus, no water will be spilled under any circumstances (partial tipping, etc.) into the common carrier's facility and this feature is very attractive to common carriers. The particular shipping practices (cartons within cartons, plastic sleeves, honey comb restraints, etc.) described above are well understood in the an and it should be realized that the instant invention may be used in any manner for it serves to nurture the plant and prevent spillage of the water reserve.

Upon arrival at the retail store, the merchant need only remove the small cartons from the master carton, remove the container/reservoir from the small carton, remove the optional plastic sleeve (if desired), and place the container/reservoir, pot and plant on the shelf for sale. The plant will arrive with a reasonable reserve of water and merchants need not concern themselves with immediate care of the plant.

Figure 4A:
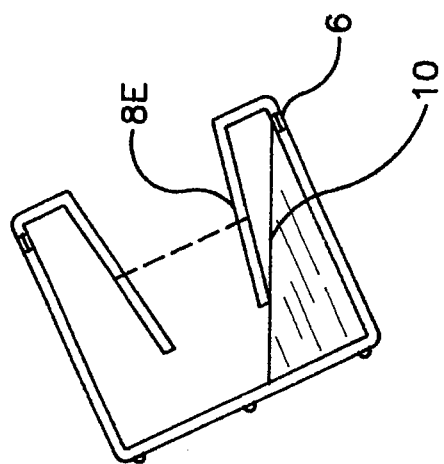
FIG. 4A is similar to FIG. 4 showing a deeper re-entrant structure and illustrating how less water is retained within the reservoir.
Figure 4B:
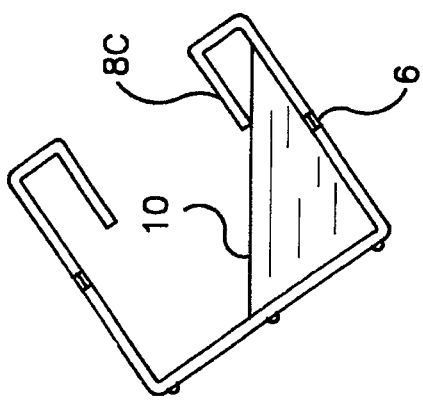
FIG. 4B is similar to FIG. 4 showing a cylindrical re-entrant structure and illustrating how less water is retained within the reservoir.
Figure 4:
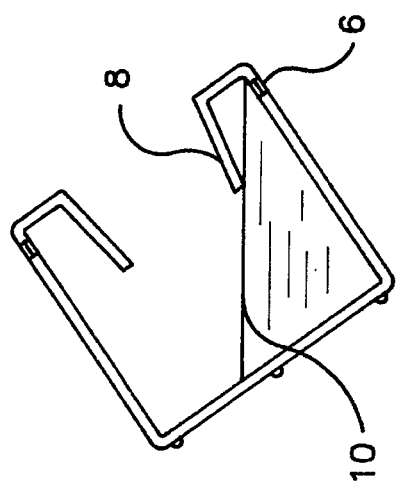
FIG. 4 is a cross-sectional view of the instant invention being tipped on edge and illustrating how the water level just touches the re-entrant structure.
Figure 6:
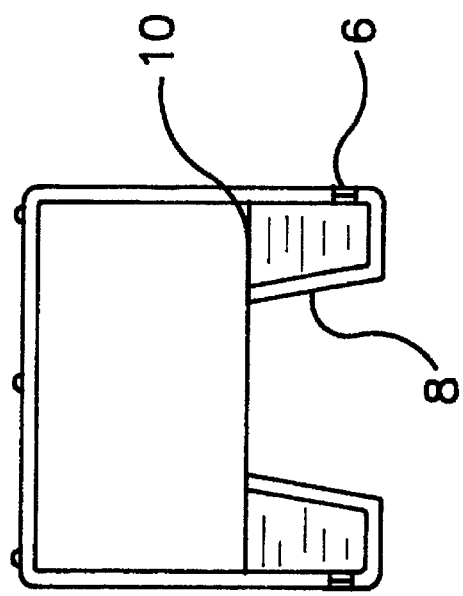
FIG. 6 is the same structure of FIG. 4 showing how water is retained within the reservoir when it is totally tipped upside down.
Figure 5:
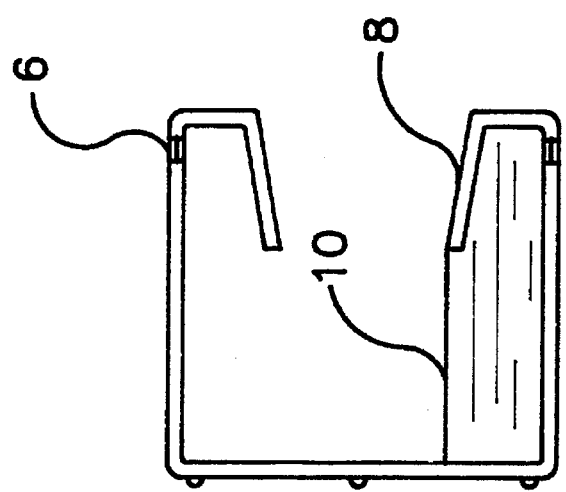
FIG. 5 is the same structure of FIG. 4 showing how water is retained within the reservoir when the container is on edge.

The purpose and operation of the re-entrant structure can be examined by carefully looking at FIGS. 4 through 6. FIG. 4 shows the container/reservoir being tipped on its side and the water level, 10, rising within the container to a point that touches the open bottom of the re-entrant structure, 8. If there is too much water within the container, it will spill out of the open hole. As the container is tipped further onto its side, the water will be entrained by the container and the re-entrant cone as shown in FIG. 5. As the container is fully turned upside down, the water becomes level, 10, and is completely entrained by the container and the reentrant structure, 8, as shown in FIG. 6.

FIG. 4A and 4B show the effect of variations in the re-entrant structure. FIG. 4A shows an extended (or deeper) re-entrant cone, 8E, and shows the water level, 10, when this structure is in the same position as shown with the structure of FIG. 4. Note that less water is entrained. This is because the water will spill out over the deeper structure. In a similar manner FIG. 4B illustrates the effect of a pure straight sided structure such as a cylinder. Here again less water is entrained than in FIG. 4.

Figure 9:
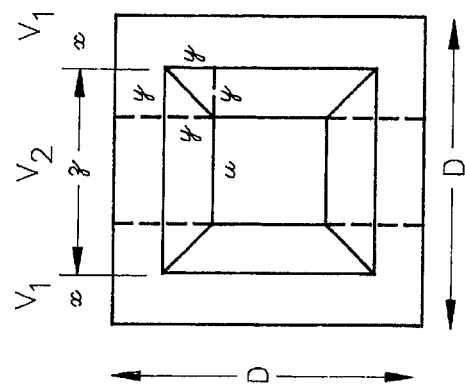
FIG. 9 is a plan view of the container giving further definitions for the mathematical proof of the optimum depth for the re-entrant structure.
Figure 7:
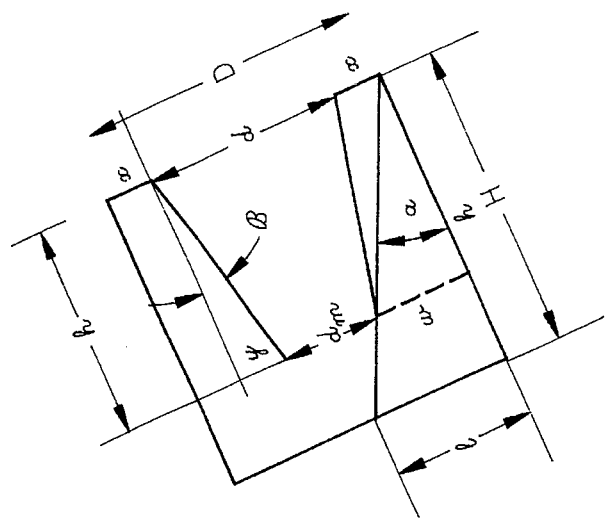
FIG. 7 is a cross-sectional view with the water level just touching the re-entrant structure as the container is being tipped and gives definitions for dimensions used in the mathematical proof of the optimum depth for the re-entrant structure.
Figure 8:
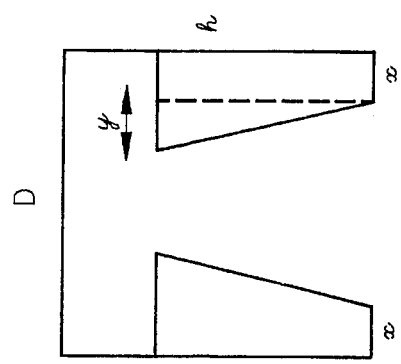
FIG. 8 is a cross-sectional view of the upside down container and gives further definitions for the mathematical proof of the optimum depth for the re-entrant structure.

Turning to FIGS. 7 through 9 a mathematical explanation and derivation of the optimum depth and structure for the instant invention will be described. FIG. 7 shows the instant invention tipped on edge and having the water reserve level even with the opening in the bottom of the re-entrant structure. If there were more water in the container, then it would spill out (or would have spilled out) of the open bottom. Thus, FIG. 7 shows the container holding a maximum volume of water, $V_{TIP}$. FIG. 8, on the other hand, shows the container fully upside down and, if there were more water in the container, then it would spill out (or would have spilled out) of the open top (now inverted). Thus, FIG. 8 shows the container holding another maximum volume of water, $V_{UP}$. If these two maximum volumes are made equal, then a formula may be derived to determine the optimum depth of the re-entrant structure. The mathematical relationships are somewhat difficult to derive for the circular form of the instant invention. These relationships are relatively easy to derive for a square form of the invention involving a square re-entrant structure, in which the side wall of the re-entrant structure is perpendicular to the top side of the enclosure, as in FIG. 4B.

$$V_{TIP}=l*H*D/2$$

and $$V_{UP}=2*h*D*x+2*h*z*x$$

where the dimensions are defined in FIGS. 7 through 9, the symbol "star" (*) means multiply, and the symbol "slash" (/) means divide. But x=(D–d)/2 and z=d and substituting in the above $V_{UP}$ may be determined simply as:

$$V_{UP}=h(D-d)(D+d).$$

$V_{TIP}$ is slightly more difficult to obtain and requires the use of simple trigonometry. l is related to the water level by the angle.

$$l=H \tan \alpha$$

$$\tan \alpha=w/h, \text{ but } w=(D-d)/2,$$

thus, $$l=H(D-d)/2h.$$

$$V_{TIP}=H*D(D-d)h/4h$$

Setting the two volumes equal yields:
h(D–d)(D+d)=H(D–d)HD/4h and cleaning up both sides of the equation yields
4h²=H²*D/(D+d). Thus, the optimum height is given by:

$$h_{optimum}=H/2*(\sqrt{D/(D+d)}).$$

But in a square container, H=D and for an example allow H=2 inches and d=1 inch, solving $$h_{optimum}=0.82".$$

Note that $h_{optimum}$ is less than one-half the container height and it should be noted that this optimum height is one-half of the container height times a factor:

$$h_{optimum}=(H/2)(\text{Factor})$$

For a square container with a square re-entrant structure the Factor is the square root of the container side divided by the sum of the container side and the re-entrant side.

If the re-entrant structure assumes the shape of a "square" cone, then it can be shown that both $V_{TIP}$ and $V_{UP}$ increase slightly due the conical shape and the Factor becomes slightly larger, thus making $h_{optimum}$ slightly larger; however, $h_{optimum}$ is still less than one-half of the reservoir height. In a similar manner, and using established principals of calculus, a mathematician can derive the relationship for $h_{optimum}$ the preferred embodiment of the instant invention which uses a circular container/reservoir and a re-entrant cone. A close approximation is given as;

$h_{optimum} = (H/2)(\sqrt{(D/(D+d))})$ where D is the diameter of the container/reservoir and d is the diameter of the re-entrant cone measured at the top.

As an example of the use of the above optimum formula, consider a 1-inch miniature plant. These plants are generally packaged in a so-called 1-inch pot. A one inch pot has a top diameter of 1.5-inches measured externally at the extreme top of the pot, a lip diameter of approximately 1.25-inches and a bottom diameter of 1-inch. The overall height is about 1.125-inches, but if measured from the lip to the bottom the pot is about 0.75-inches. The dimensions of the re-entrant structure are set by the pot and it will take the form of a cone to match the pot. The top opening will have a diameter of 1.25 inches and tapering over a distance of 0.75-inches to a diameter of 1.125 inches.

Miniature pots are generally shipped in a master container that holds 36 plants. The bottom of a typical master carton has circular openings of 2.125-inches, diameter, which are designed to receive and hold the container. The overall master carton is roughly 4-inches high which then sets the container to approximately 2-inches. Applying the optimum height formula:

$$h_{optimum} = 2/2\,(\sqrt{(2.125/(2.125 + 1.25))})$$
$$= 1(\sqrt{(2.125/3.375)})$$
$$= 0.79\text{-inches}$$

or roughly 0.8 inches

This example could readily be expanded to larger pots and larger master containers.

Finally, it should be noted that the open-ended re-entrant structure could be used in numerous applications, not related to plant transportation, in which a liquid is to be retained within a reservoir.

The instant invention has concerned itself with the best embodiment for a miniature flower pot transportation and storage container. The dimensions given in the examples can easily be extended to provide a container for any sized pot and these dimensions should not be construed to limit the device. There has been disclosed heretofore in the above discussion the best embodiment and best mode of the present invention presently contemplated. It is to be understood that the examples given and the dimensions may be changed, that dimensions are based on miniature flower pots and that modifications can be made thereto without departing from the spirit of the present invention.

We claim:

1. A leak-resistant open transportation and storage container device for retaining a volume of liquid with the container in any orientation comprising:

a hollow enclosure with a diameter, D, having a top side, a bottom side, and a side wall with a height, H, each of said top and bottom sides and said side wall having an inner surface and an outer surface, said enclosure having a central axis extending between said top and bottom sides thereof and further having an aperture formed in and extending through said top side thereof coaxial with said central axis, said aperture having a periphery and a diameter, d, said enclosure being bifurcated along a bifurcation line into a top portion including said top side and said aperture therein, and a portion of said side wall, and a bottom portion including said bottom side and the remaining portion of said side wall, said top portion and said bottom portion being joined together along said bifurcation line; and a hollow fully open ended inverted frusto-conical re-entrant structure having a top edge, a bottom edge, and a continuous side wall, said side wall having an inner surface and an outer surface, said re-entrant structure being interconnected at said top edge to said top side of said enclosure, coaxial with said central axis, with said top edge extending around said periphery of said aperture, and projecting from said top side of said enclosure toward said bottom side of said enclosure through a height, h, generally within the range of ¾ to ¼ of the distance between said top side and said bottom side, providing an extended open passageway from the exterior of said enclosure to the interior of said enclosure, with said bottom edge of said re-entrant structure being located above said inner surface of said bottom side of said enclosure, said side wall of said re-entrant structure forming a barrier against the flow of liquid from the interior of said enclosure to the exterior thereof along said inner surface of said side wall of said re-entrant structure and through said aperture so as to retain liquid between said side wall of said re-entrant structure, said side wall of said enclosure, and said top side of said enclosure when said enclosure is tilted or inverted, with the volume of liquid so retained being maximized by optimizing height, h, to a height, $h_{optimum}$, with $h_{optimum}$ being approximated by the formula.

$h_{optimum} = (H/2)(\sqrt{(D/(D+d))})$.

2. A leak-resistant open transportation and storage container device for retaining a volume of liquid with the container in any orientation comprising:

a hollow enclosure having a diameter, D, and further having a top side, a bottom side, and a side wall having a height, H, each of said top and bottom sides and said side wall having an inner surface and an outer surface, said enclosure having a central axis extending between said top and bottom sides thereof and further having an aperture formed in and extending through said top side thereof coaxial with said central axis, said aperture having a periphery and a diameter, d, said enclosure being bifurcated along a bifurcation line into a top portion including said top side and said aperture therein, and a portion of said side wall, and a bottom portion including said bottom side and the remaining portion of said side wall, said top portion and said bottom portion being joined together along said bifurcation line; and a hollow fully open ended inverted frusto-conical re-entrant structure having a top edge, a bottom edge, and a continuous side wall, said side wall having an inner surface and an outer surface and having a height, h, said re-entrant structure being interconnected at said top edge to said top side of said enclosure, coaxial with said central axis, with said top edge extending around said periphery of said aperture and projecting from said top side of said enclosure towards said bottom side of said enclosure, providing an extended open passageway from the exterior of said enclosure to the interior of said enclosure, with said bottom edge of said re-entrant structure being located above said inner surface of said bottom side of said enclosure, said side wall of said re-entrant structure forming a barrier against the flow of liquid from the interior of said enclosure to the exterior thereof along said inner surface of said side wall of said re-entrant structure and through said aperture so as to retain liquid between said side wall of said re-entrant structure, said side wall of said enclosure, and said top side of said enclosure when said enclosure is tilted or inverted.

3. The leak-resistant transportation and storage container device of claim 2, wherein said height of said hollow open ended inverted frusto-conical re-entrant structure may be optimized to a height, $h_{optimum}$, so as to maximize the volume of liquid retained in said enclosure regardless of the orientation of said enclosure, said optimum height being approximated by the formula:

$$h_{optimum} = (H/2)(\sqrt{D/(D+d)}).$$

* * * * *